(12) United States Patent
McLeod et al.

(10) Patent No.: US 9,323,819 B1
(45) Date of Patent: Apr. 26, 2016

(54) FACILITATING VALID DATA ENTRY

(75) Inventors: Alexander C. McLeod, North Reading, MA (US); Paul D. Tynan, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 377 days.

(21) Appl. No.: 12/980,621

(22) Filed: Dec. 29, 2010

(51) Int. Cl.
*G06F 17/30* (2006.01)

(52) U.S. Cl.
CPC ................................ *G06F 17/30572* (2013.01)

(58) Field of Classification Search
CPC .................................................. G06F 17/30572
USPC .................. 707/802, 803–805, 809, 999.102; 715/741, 823; 709/245, 224
See application file for complete search history.

(56) References Cited

U.S. PATENT DOCUMENTS

| | | | |
|---|---|---|---|
| 2002/0065910 A1* | 5/2002 | Dutta | 709/224 |
| 2005/0102258 A1* | 5/2005 | Tecu et al. | 707/1 |
| 2005/0132297 A1* | 6/2005 | Milic-Frayling et al. | 715/745 |
| 2006/0059429 A1* | 3/2006 | Batthish et al. | 715/741 |
| 2006/0067336 A1* | 3/2006 | Matsuda | 370/397 |
| 2006/0069807 A1* | 3/2006 | Tagawa | 709/245 |
| 2007/0282964 A1* | 12/2007 | Behrend et al. | 709/208 |
| 2008/0040371 A1* | 2/2008 | Bayyapu et al. | 707/101 |

* cited by examiner

*Primary Examiner* — Syling Yen
(74) *Attorney, Agent, or Firm* — Krishnendu Gupta; Jason A. Reyes

(57) ABSTRACT

A method is used in facilitating valid data entry. Data is received from a single data entry field. Based on a data entry event, the data is checked for validity against multiple permissible data formats. Based on the checking, validity checking results are generated.

16 Claims, 4 Drawing Sheets

LABEL: [         ]

FIG. 3A

VALIDATION LIST
LABEL: [ 1 ]          ✔ NETWORK NAME
              ✔ IPV4 - #.#.#.#
              ✔ IPV6 - #.#.#.#.#.#.#.#

FIG. 3B

LABEL: [ E ]          ✔ NETWORK NAME
              ✗ IPV4 - #.#.#.#
              ✔ IPV6 - #.#.#.#.#.#.#.#

FIG. 3C

LABEL: [ E M ]        ✔ NETWORK NAME
              ✗ IPV4 - #.#.#.#
              ✗ IPV6 - #.#.#.#.#.#.#.#

FIG. 3D

FACILITATING VALID DATA ENTRY

BACKGROUND

1. Technical Field

This application relates to facilitating valid data entry.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage configuration tasks. Such tasks may include, for example, configuring storage for use with a particular software application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like.

Distributed data processing systems involve data transfers between clients and servers (e.g., data storage systems) (also referred to as services). Typically, a client locates a server, initiates a session with a server and requests the server to perform some service (e.g., for configuring storage). The server expects requests from a client to arrive in a particular format. A server is more complex than a client because the server typically handles a large number of clients simultaneously, often fetches and stores information from a large database, creates additional transactions for others services, performs business logic, and returns information formatted according to each client channel.

For example, data will be specified in a particular message format. A particular transmission protocol will deliver the message to the server. The server accepts the message protocol as its application programming model (API) to its services and returns a result. A variety of software systems, such as Java, Adobe Flex, Enterprise Java Beans (EJB), Servlets, Java Server Pages (JSP), and XML have been implemented to enhance the development of client and server-side software.

Client applications perform a number of different functions. For example, the application on the client side handles the user interface and may provide program logic for processing user input. Additionally, a client application must match the requirements of a particular server to provide communications with the particular server. Clients are packaged and distributed according to the services provided by the server.

A graphical user interface (GUI) exists in the client application to handle what the user views on the screen. Events resulting from user input, such as mouse clicks or keyboard strokes, are detected and handled using "listener" processes in the application. The events are processed by program logic. The program logic may result in requests being sent to a server. Communication with the server is provided using processes that use protocols, such as hypertext transfer protocol (HTTP), secure sockets (SSL), or Remote Method Invocation (RMI).

Client software can be either "thick" or "thin". A thick client is typically a large client-installed application that may access data storage and/or a database directly and apply business logic. Thick clients typically have dependence on the client operating system and require manual support to install and configure. By contrast a thin client is typically a small application downloaded on request from a server and accesses data storage or the database through an intermediate application server. This is known as a multi-tier application. A number of different usage scenarios for clients are present, resulting in a variety of client needs being present. For example, it is typical that in an global enterprise Intranet, the client configuration is controlled by the business but the large number of clients includes older machines with slow networks. Likewise, in the Internet, there is little configuration control by the business and it is estimated that a large percentage of clients worldwide still use low speed connections that result in very slow network speeds and downloads. A typical user will become very frustrated if downloads take longer than a minute or two. Further, mobile users require compact software that can be customized and packaged to fit on machines and operate disconnected from the network. Subsequent automated support to connect to the network is needed.

At the other end of the spectrum, power users with high speed connections expect screen refresh times in the sub-second range and "instantaneous" echoing of typed characters to provide the look and feel of processing in a local environment. In a multi-tier computing environment, the primary role of the client is to present and gather information quickly. The client application is considered a business asset independent of the network topology and server function. In these environments, it is desirable to be able to use the same client processing code for different user types and interface channels, such as automated teller machines (ATM), Kiosks, Internet [hypertext markup language (HTML)/applets], and regional office clients (applications).

Consequently, a common thin or thick client development environment for developing clients may be used to solve these problems, especially when the size and speed of the application download, integration and operation is important.

Object-oriented languages have been employed in creating thin clients. Object-oriented programming environments have been presented as providing software reuse, which is a desirable feature in creating thin clients and reducing development time.

Data management programs such as data storage configuration software typically include user interfaces that display a document and contain various fields for user input. Each user input field typically represents a different category of information, and the user typically enters one piece of information per field.

In such systems wherein data is solicited and input via an entry data entry form made up of multiple data entry fields, it is typical that when the data entry form is submitted for entry, each data entry field is validated against a predetermined criteria. This process is generally referred to as validating the data input. This validation process is often used to ensure that data is input in the proper format and within a reasonable range of expected values. For example, a data entry field which solicits a telephone number should not typically include letters. Thus, during the validation process, the criteria established for this data entry field which requires that all data input into the telephone number field be numeric will be checked. To assure validation consistency among all applications using a database for example, the validation criteria is typically defined by a set of validation rules. The validation rules are often included as a part of, and enforced by, a corresponding database application. If the criteria is not met, validation fails and requires correction of the entered data before it can be accepted and stored in the database. Typically, once the submitted data has failed to be validated, no further data entry fields on the submitted data entry form are reviewed regardless of whether or not the other data fields contain valid data which meets all predetermined criteria for validation. This failure in data validation results in the database application generating an exception indicating that the submitted data entry form contains data which does not meet the predefined criteria for validation. The data entry form is presented to a user again. The user can then make corrections to data entry fields as may be necessary and then resubmit the data entry form. Upon re-submission, the data entry fields of the data entry form are again reviewed (submitted for validation). Where multiple errors have been made in the entry of data in the data fields of the submitted form, the typical database system rejects the submitted data form by generating multiple exceptions and representing the data form to a user for correction until each and every invalid data field meets the predetermined criteria. This is a time consuming, resource consuming, iterative process. Typical database systems cause the user interface used to present the data entry form to a user, to iterate and be presented to the user for correction each time validation of data entry fails. This increases the time and resources required to validate all fields of data entered.

There are known various simple methods for applications to help validate data received. These are for example text filters or numeric filters, logical tests of the inputs, checking the lengths of the inputs and the like. Thus it may be prevented that, e.g., a user can enter a first name in a field intended for telephone numbers or enter the 32nd day of a month in a field intended for a date.

In at least some systems, a validation rule as referenced above is a logical sequence of operators and operands for performing one or more tests or comparisons on data in one or more fields to make sure the data is valid. The user interface may implement a particular form using a set of validation rules to ensure correct entry of data. The validation rules test the contents of each field entered by the user to ensure that the field is filled out correctly, either after the user enters data into the field, or after the form is transmitted back to the server.

In web-based systems involving data entry, checking the validity of the data may be done in at least three ways: 1. Check the data only at the client. This lets the system be responsive to the user (helpful messages can be displayed in a timely way), but may leave the system open to bad data from entities that bypass the client and speak directly to the server. 2. Check the data only at the server. This ensures that the server does not accept bad data, no matter what client is used to send it, but it may take a while to display messages to the user when data is incorrectly entered. 3. Check the data at the client and at the server. This is responsive to the user and is safe from bad data, but requires more engineering work because the data validation code is maintained on two platforms.

Data storage networks and other computer networks use rules governing the transmission and reception of data. These rules of the computer network are often referred to as a protocol. There are many different protocols that are being used today in combination with computer networks. One important protocol in use today is the Internet Protocol (IP). The Internet Protocol is the network layer protocol in the TCP/IP communications protocol suite.

A data session with a data storage system or other computer system may be initialized by sending a service request to a service provider, e.g., the data storage system, an application server, web server, or bank computer. The service request is addressed by an IP address known by the sender that identifies the service provider. Alternatively and more convenient for the sender, the request can be addressed to a host name given in plain language. Then, a Domain Name Server (DNS) is used to lookup for a corresponding IP address that identifies the service provider, respectively the host. For details about the DNS, reference is made to Fred Halsall, 'Data Communications, Computer Networks and Open Systems', Addison-Wesley, 4.sup.th edition 1997, pp. 758, 767, 816 820.

As defined in RFCs 1034 ("Domain Names—Concepts and Facilities"), 1035 ("Domain Names Implementation and Specification") and 883 (Domain names—Implementation and Specification"), a network resource (e.g., host) is identified in the domain name space by a string containing 1 or more labels (each up to a maximum of 63 characters), separated by periods. The periods are intended to define and outline the hierarchical structure of domain name space. Although RFC 1034 permits the use of 8-bit binary encoding, it is suggested that applications use 7 bit ASCII for naming. Further, the suggested and currently implemented (de facto) naming scheme uses labels consisting only of alphanumeric characters from the Latin (ISO Latin 1) Character set plus the hyphen character. A valid name must start with a letter and the rest of the name should contain only letters, digits or hyphens.

Thus, the naming conventions for domains (and consequently sites and URLs) are rather restricted. Typically, there is an attempt to identify a particular site with a particular site owner, so that the address is meaningful. For example, IBM has a web site with the address "http://www.ibm.com" (".com" indicates commercial), Microsoft has the address "http://www.microsoft.com" but Microsoft Network has the address of "http://www.msn.com". The restrictions make it easy to create a one-to-one mapping between web addresses and a particular site. However, these addresses must be entered accurately. Any mistake will result in the site not being located.

The current Internet Protocol version is known as IPv4 (IP Version 4). Because of the rapid growth of the Internet the IPv4 address space will eventually be exhausted. The new version of Internet Protocol is known as IPv6 (IP Version 6). IPv6 aims to provide increased functionality for computer network communications.

The migration from IPv4 to IPv6 will not be an immediate process, but will take some period of time to accomplish. As a result, there will be a transition period where some systems are using IPv4 and some systems are using IPv6. Thus during the transition period, the IPv4 and IPv6 protocols need to coexist.

The IPv4 specification is disclosed in "INTERNET PROTOCOL; DARPA INTERNET PROGRAM PROTOCOL SPECIFICATION", Information Science Institute University of Southern California, September, 1981. The IPv6 specification is disclosed in S. Deering "INTERNET PROTOCOL: Version 6 (IPv6)", Xerox, PARC, December 1981.

The notation of the IPv4 address is defined in accordance with the following rule:

1. the address is delimited every eight bits by a period (".") and values in respective eight bit areas are represented in decimal.

Example: 123.3.2.1

The notation of the IPv6 address is defined in accordance with the following rules:

1. the address is delimited every 16 bits by a colon (":") and values in respective 16-bit areas are represented in hexadecimal;

Example: 1234:5678:9abc:def0:0fed:cba9:8765:4321

2. when 16 bits in a delimited area are all zeros, this situation may be represented by "::";

Example: 1234::9abc:def0:0fed:cba9:8765:4321

3. when 16 bits in successive delimited areas are all zeros, this situation may be represented by a single "::";

Example: 1234::4321

4. when an IPv4 address is included in the lower 32 bits, the IPv4 address notation may be used for the lower 32 bits.

Example: ::ffff:133.144.95.22

Adobe Flex is a collection of technologies released by Adobe Systems for the development and deployment of cross platform rich Internet applications based on the Adobe Flash platform. Flex provides a workflow and programming model that is familiar to developers. Macromedia XML ("MXML"), an eXtensible Markup Language ("XML")-based markup language, offers a way to build and lay out graphic user interfaces. Interactivity is achieved through the use of ActionScript, the core language of Flash Player that is based on the European Computer Manufacturers Association ("ECMA") ECMAScript standard. A Flex software development kit ("SDK") comes with a set of user interface components including buttons, list boxes, trees, data grids, several text controls, charts, graphs and various layout containers. Other features such as web services, drag and drop, modal dialogs, animation effects, application states, form validation, and other interactions round out the application framework.

A Flex application may be a rich internet application ("RIA"). RIAs introduce an intermediate layer of code, often called a client engine, between the user and the server. This client engine is typically downloaded as part of the instantiation of the application, and may be supplemented by further code downloads as use of the application progresses. The client engine acts as an extension of the browser, and usually takes over responsibility for rendering the application's user interface and for server communication. What can be done in a RIA may be limited by the capabilities of the system used on the client, but in general, the client engine is programmed to perform application functions that its designer believes will enhance some aspect of the user interface, or improve its responsiveness when handling certain user interactions, compared to a standard Web browser implementation. Also, while simply adding a client engine does not force an application to depart from the normal synchronous pattern of interactions between browser and server, in most RIAs the client engine performs additional asynchronous communications with servers.

In a multi-tiered model, Flex applications serve as the presentation tier. Unlike page-based Hypertext Markup Language ("HTML") applications, Flex applications provide a stateful client where significant changes to the view don't require loading a new page. Similarly, Flex and Flash Player provide many useful ways to send and load data to and from server-side components without requiring the client to reload the view. To incorporate a Flex application into a website, one typically embeds Shockwave Flash (.SWF) file in an HTML, JavaServer Pages ("JSP"), Adobe, ColdFusion, or other type of web page. The page that embeds the SWF file is known as the wrapper. A wrapper consists of an <object> tag and an <embed> tag that format the SWF file on the page, define data object locations, and pass run-time variables to the SWF file. In addition, the wrapper can include support for history management and Flash Player version detection and deployment.

SUMMARY OF THE INVENTION

A method is used in facilitating valid data entry. Data is received from a single data entry field. Based on a data entry event, the data is checked for validity against multiple permissible data formats. Based on the checking, validity checking results are generated.

BRIEF DESCRIPTION OF THE DRAWINGS

Features and advantages of the present invention will become more apparent from the following detailed description of exemplary embodiments thereof taken in conjunction with the accompanying drawings in which:

FIGS. 3A-3D, 4A-4B are examples of user interface elements that may be used with the techniques described herein.

DETAILED DESCRIPTION OF EMBODIMENT(S)

Described below is a technique for use in facilitating valid data entry, which technique may be used to help provide, among other things, a single field entry method for data which provides validation feedback for multiple allowed data formats. At least one implementation includes a means to provide a single field data entry control which provides feedback to the end user regarding the validity of the input data as it relates to multiple different allowed input formats. Conventionally, a system has multiple input controls wherein the user must first select the type of data that will be entered. Such a conventional system requires more on-screen real estate which increases as the number of valid data formats grows, and can cause user confusion regarding the need to only enter one data value as it seems to appear to some users that the presentation requires data be entered into each possible input field. By contrast, by use of the technique described herein, a system can be provided in which less on screen real estate is required, the user need not first indicate the type of data being entered, feedback can be provided immediately on a per-entered-character basis showing validation results as it applies to each possible data format, and the system assists in providing a modern, state-of-the-art, Rich Internet Application end user experience and simplifies the user's interaction with a data storage system management interface.

Figure 1:
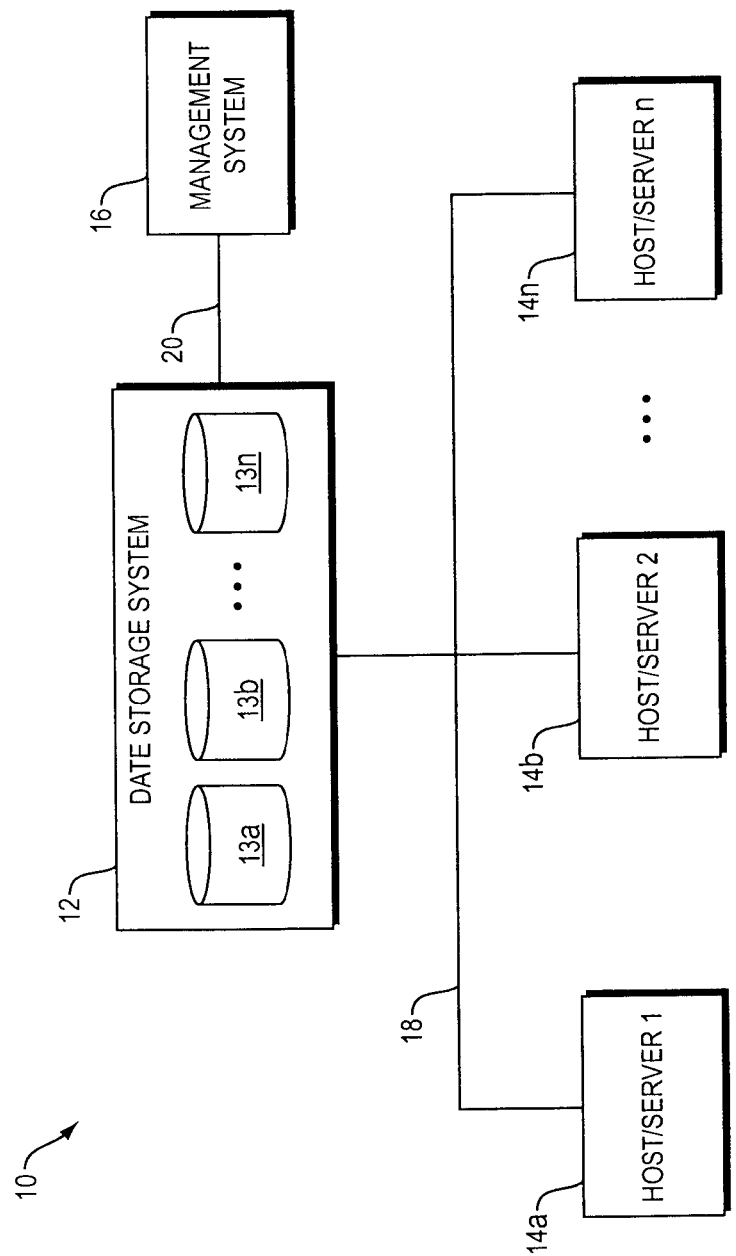
FIGS. 1-2 are examples of embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may include hardware and software for hosting the data storage of the one or more applications executing on the hosts 14a-14n. The systems 12 may each include one or more storage processors and one or more devices upon which data is stored. Data storage administration tasks may be performed for the system 12 storing the data of the hosts. Such tasks may include provisioning or allocating the data storage for use by the hosts and/or applications, backing up data from the storage system, and the like. As an example in connection with an email application server component that may executed on the hosts 14a-14n, the data storage configuration tasks may include allocating storage for user accounts or mailboxes, specifying the devices (logical and/or physical) used to store the email data, specifying what data protection process and selected facility or tool is used, specifying a schedule and/or retention policy for data protection, and the like.

The data storage systems 12 may include one or more data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a sizes, arrangements, products, and the like, which are exemplary. However, it will be appreciated by those skilled in the art that this is for purposes of illustration and should not be construed as a limitation of the techniques herein.

Figure 2:
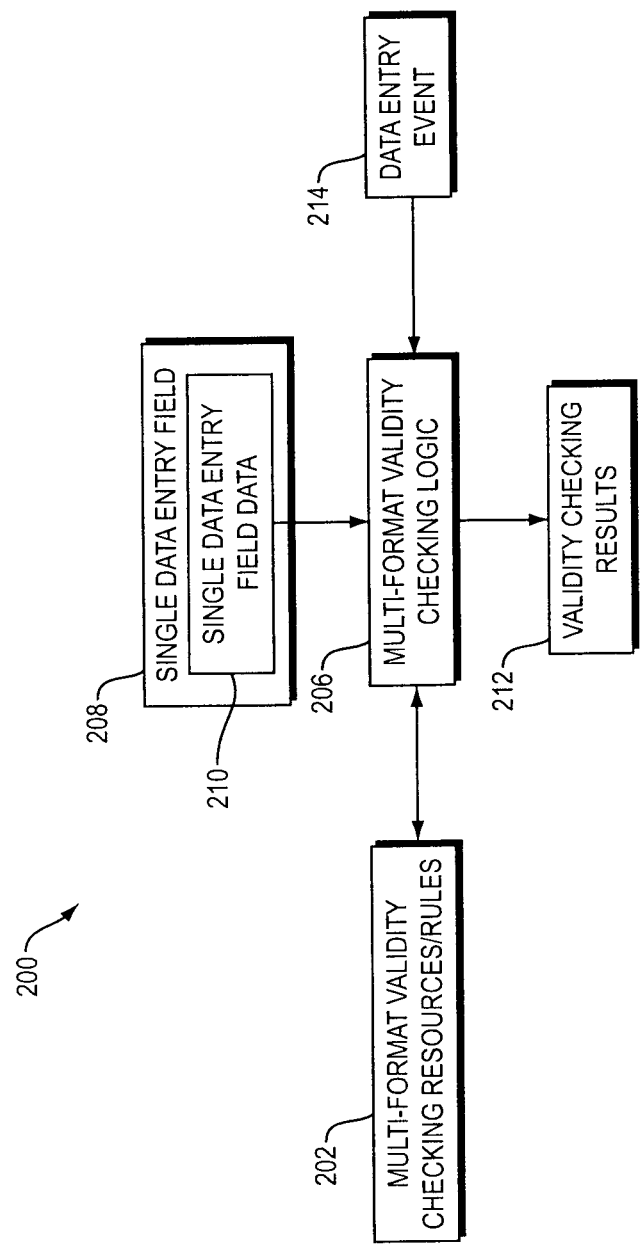

Referring to FIG. 2, shown is an example representation of components of a format validity checking system 200 that may be included in the management system 16 and/or data storage system 12 and/or one or more of hosts 14a-14n for use with the technique described herein. In at least one implementation, system 200 may be software that is installed and run on a system 16 or host 14a-14n or downloaded from system 12 as, for example, an applet.

A single data entry field 208 has single data entry field data 210. For example, field 208 may be included on a data entry form of a user interface and may be where a user is expected to enter a network address in one of multiple formats, and data 210 may include keystroke data entered by such user. In response to a data entry event 214, multi-format validity checking logic 206 checks data 210 based on multi-format validity checking resources/rules 202 to produce validity checking results 212. In an example, event 214 may be or include an event signifying a change in data 210, e.g., as a result of a keystroke by the user such that a character has been added to or deleted from field 208 by the user. As described in more detail below, depending on the implementation, resources/rules 202 may include format validation rules, a logic tree, and/or a lookup table or other mechanism, to provide logic 206 with guidance as to checking data 210 against multiple permissible formats. Results 212, for example, may include a report as to which of multiple formats, if any, are a match to data 210, which may lead to one or more actions and/or notifications back to the user.

FIGS. 3A-3D illustrate graphical user interface examples in accordance with the current technique, wherein a "Label" refers to a field serving as field 208, with contents serving as field data 210. As shown in FIG. 3A, a standard form item is presented for input, and "Label" may indicate what the value is, e.g., network address.

FIG. 3B illustrates that the user has entered a character "1" in the field, such that the field has field data of "1". Next to the field is a validation list of multiple permissible formats for the contents of the field, here Network Name (i.e., host name), IPV4, and IPV6, with corresponding check marks next to every item in the validation list, which indicates to the user that, so far, the field data is consistent with all of the multiple permissible formats.

FIG. 3C illustrates that the user has entered a character "E" in the field, such that the field has field data of "E". Corresponding check marks are shown next to Network Name and IPV6 in the validation list, which indicates to the user that, so far, the field data is consistent with Network Name and IPV6 formats. A "X" mark next to IPV4 in the validation list indicates to the user that the field data is inconsistent with IPV4 format.

FIG. 3D illustrates that the user has entered characters "EM" in the field, such that the field has field data of "EM". A corresponding check mark shown next to Network Name in the validation list, which indicates to the user that, so far, the field data is consistent with Network Name format. "X" marks next to IPV4 and IPV6 in the validation list indicate to the user that the field data is inconsistent with IPV4 and IPV6 formats.

In another example, FIGS. 3A-3D may be considered to represent a chronological sequence starting with FIG. 3A and ending with FIG. 3D. As field data is entered, the validation list is displayed, to show the permissible format with which the field data is consistent. If the user types a "1", so far this is valid for Network Name, IPV4, and IPV6. If instead the user decides to enter EMC.COM, once the "1" is deleted and the "E" is entered the field data is no longer valid for IPv4 but it is still valid for a Network Name and for IPV6 (which allows hex numbers). As the user continues to type (which generates events serving as events 214), the validation list dynamically updates with check marks and/or "X" marks as appropriate.

Figure 4A:
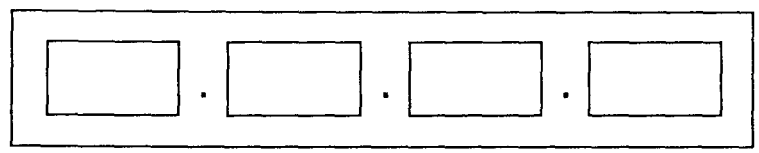
Figure 4B:
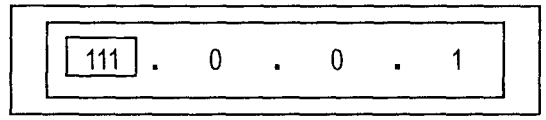

With respect to FIGS. 4A, 4B and IPV4, it is observed that users type period delimiters and expect typing them to move focus to the next field, so it is not necessary to provide this guidance in the field itself (as shown in FIG. 4A), especially if the field illustrates format-valid examples, which provides a hint as to what is valid and expected.

One or more implementations may include one or more of the following features. The validation list may be shown when no field data is present, optionally only when the field has focus, to show the type of field data that is expected to be entered. Hovering over a validation list entry may cause the validation rules corresponding to that format to be shown. Validity and invalidity may be shown in any of multiple different ways; for example, validation list entries for formats for which field data is invalid may fade from view after a few seconds.

In the case of the example of FIGS. 3A-3D, it is not necessary for the user to indicate in advance which format is intended, since all three formats in the validation list are suitable. However, in other implementations, the control may be enhanced to allow and/or require the user to indicate which format is intended if required by the corresponding use case.

In at least one example implementation, the technique may be used in a data storage system's setup GUI which may require the user to enter one or more network or IP addresses. Specifically, the GUI may be included in management console software such that the first time the user interacts with the data storage system, an initial configuration wizard executes and prompts the user at least once for a network name or IP address.

One or more embodiments of the technique may be implemented in Adobe Flex or Java, and may rely on an event driven environment in which an event occurs each time a character is entered or deleted, so that the field data can be checked upon each event (i.e., "on the fly"). In an alternative embodiment, field data may be checked only after when the user indicates that the user has completed entering field data, e.g., by clicking "validate" or pressing a return key.

Advantages of at least some "on the fly" implementations include catching typographical errors or mistakes earlier, and more dynamic confirmation or feedback to the user regarding whether the user is on the right track while entering field data.

In at least some client-server cases, responsiveness is highly effective where system 200 is provided at the client only, or is provided in a distributed way across a sufficiently fast network connection.

In an enhanced implementation, which also benefits from a fast network connection, field data may be checked dynamically for content as well as format, so that the user has confirmation or feedback not only with respect to multiple permissible formats but also with respect to permissible content. Thus, for example, if the field data is for identifying a network resource such as a host or data storage system, the validation list may have check or "X" marks or other indications that report not only whether the field data is consistent with a permissible format but also whether the field data is consistent with information about existing network resources.

System 200 and its logic 206 may be implemented in any of multiple different ways, for example, as software that is or includes or is included in a database application as now described. The database application reviews data 210 to determine whether it meets predetermined criteria (e.g., validation rules of rules/resources 202). This review process is referred to as data validation. Where data 210 is found not to meet the validation rules for one of the multiple formats, the data is said to be invalid for that format and a validation error occurs for that format. When such a validation error occurs the database application generates an exception object (exception) that identifies the format for which the data is invalid. Each exception identifying formats is included in an exception set that aggregates all generated exceptions which specify formats for which the data is invalid. Subsequently, the exception set containing all exceptions may be provided as results 22. The database software may be, for example, an Oracle™ database package with Java Database Connectivity (JDBC) interface, EX or Microsoft™ Object Oriented Database Connectivity (MS ODBC) interface. JDBC is an application-programming interface (API) for linking Java™ programs to a database system. JDBC allows linking of any Java based program to any database utilizing the JDBC interface. In an alternative embodiment, the database software may be a special purpose application designed especially for, and/or integrated into, the data storage system.

In another example, system 200 and its logic 206 may be implemented as software that is or includes or is included in a logic tree system or decision tree system as now described. A key part of such systems is a knowledge base, which is a repository of information about the permissible formats. Such information is organized in data trees in which it can be accessed at any level. The data is generally arranged hierarchically, in a tree-like structure, so that more detail is derived as one moves farther toward the tips of tree branches, with more generality toward the root of the tree. In addition to the tree-structured data organization, the knowledge base contains rules for dealing with the field data, and for proceeding further down the tree based on the decisions made about each character, in turn, of the field data. The field data and associated rules are the key to using the knowledge base.

In another example, system 200 and its logic 206 may be implemented as software that applies a brute force approach to implementing and executing against validation rules that may involve the creation of at least one rule (or pattern) for each of the multiple permissible formats and every possible configuration or combination of characters within field 208.

In another example, system 200 and its logic 206 may be implemented as software and/or hardware that is or includes or is included in a lookup table (e.g., a massive lookup table in memory or in data storage) of every possible configuration or combination of characters within field 208 and the multiple permissible formats. Thus, all validation results 212 can be pre-computed, and the only computational requirement may be a constant time memory look-up.

In another example, system 200 and its logic 206 may be implemented as software and/or hardware that is or includes or is included in a rules engine system, wherein logic 206 serves as a rules engine and resources/rules 202 serve as validation rules interpreted by the rules engine. An important advantage of the rules engine is that its rules can be adjusted and new rules introduced without the need for anything in the rules engine to be recompiled. As input, the rules engine takes data files representing sets of validation rules and interprets them against field data 210.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in facilitating valid data entry, the method comprising:
   receiving data from a single data entry field;
   providing a validation list of multiple permissible data formats;
   based on a data entry event, checking data format of the data for validity against the multiple permissible data formats, wherein the data format relates to the configuration of the data, further wherein the data entry event is one of the addition or deletion of data from the data entry field; and
   based on the checking, providing validity checking results relating to the data format of the data received from the single data entry field;
   wherein providing the validity checking results, comprises:
   updating the validation list to include consistency marks relating to each of the multiple permissible data formats, wherein the consistency marks indicate whether the permissible data formats are consistent or inconsistent with the data received from the single data entry field; and
   displaying the updated validation list next to the data entry field such that the consistency marks in the displayed updated validation list show whether the data received from the single data entry field is consistent or inconsistent with the permissible data formats.

2. The method of claim 1, wherein feedback is provided immediately on a per-entered-character basis showing the validity checking results as applied to each permissible data format.

3. The method of claim 1, wherein the checking assists in providing a Rich Internet Application end user experience.

4. The method of claim 1, wherein the single data entry field is included on a data entry form of a user interface and a user is expected to enter a network address in one of the multiple permissible data formats.

5. The method of claim 1, wherein the data entry event includes keystroke entry by a user.

6. The method of claim 1, wherein the checking is based on multi-format validity checking rules.

7. The method of claim 1, wherein the multiple permissible data formats include host name, IPV4, and IPV6.

8. The method of claim 1, wherein the validity checking results are used in a data storage system's setup GUI which may require the user to enter one or more network or IP addresses.

9. A system for use in facilitating valid data entry, the system comprising:
   a processor comprising a program logic for carrying out the steps of:
   first logic receiving data from a single data entry field;
   second logic providing a validation list of multiple permissible data formats;
   based on a data entry event, third logic checking data format of the data for validity against the multiple permissible data formats, wherein the data format relates to the configuration of the data, further wherein the data entry event is one of the addition or deletion of data from the data entry field; and
   based on the checking, fourth logic providing validity checking results relating to the data format of the data received from the single data entry field;
   wherein providing the validity checking results, comprises:
   updating the validation list to include consistency marks relating to each of the multiple permissible data formats, wherein the consistency marks indicate whether the permissible data formats are consistent or inconsistent with the data received from the single data entry field; and
   displaying the updated validation list next to the data entry field such that the consistency marks in the displayed updated validation list show whether the data received from the single data entry field is consistent or inconsistent with the permissible data formats.

10. The system of claim 9, wherein feedback is provided immediately on a per-entered-character basis showing the validity checking results as applied to each permissible data format.

11. The system of claim 9, wherein the checking assists in providing a Rich Internet Application end user experience.

12. The system of claim 9, wherein the single data entry field is included on a data entry form of a user interface and a user is expected to enter a network address in one of the multiple permissible data formats.

13. The system of claim 9, wherein the data entry event includes keystroke entry by a user.

14. The system of claim 9, wherein the checking is based on multi-format validity checking rules.

15. The system of claim 9, wherein the multiple permissible data formats include host name, IPV4, and IPV6.

16. The system of claim 9, wherein the validity checking results are used in a data storage system's setup GUI which may require the user to enter one or more network or IP addresses.

* * * * *